3,507,179
ROTARY DIE SAWING AND DRILLING
MACHINE
Louis E. Sauer and Orville C. Miller, St. Louis, Mo., assignors to Centenary Central, Inc., St. Louis, Mo., a corporation of Missouri
Filed Feb. 2, 1967, Ser. No. 613,536
Int. Cl. B26d 5/08
U.S. Cl. 83—564                           1 Claim

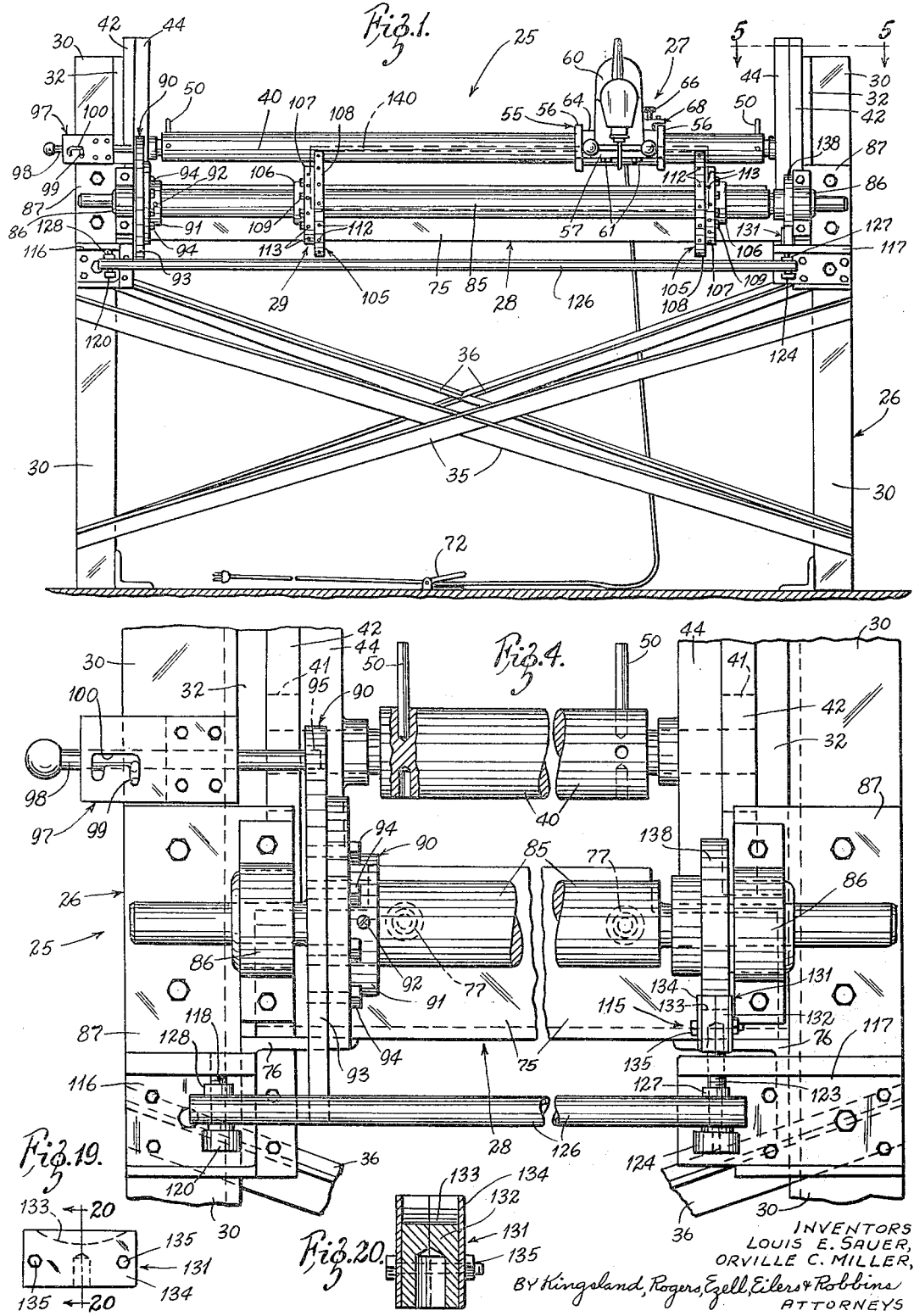

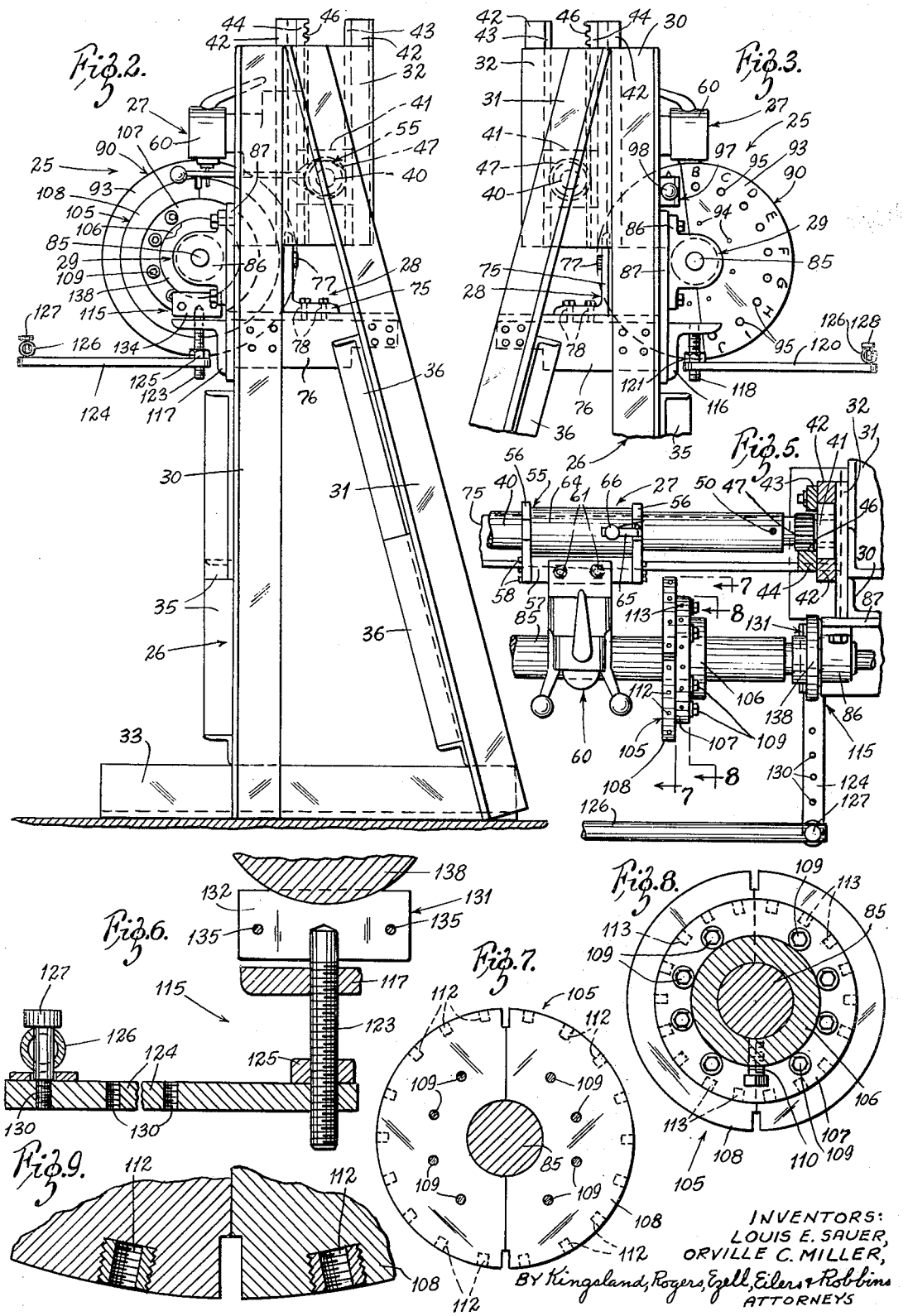

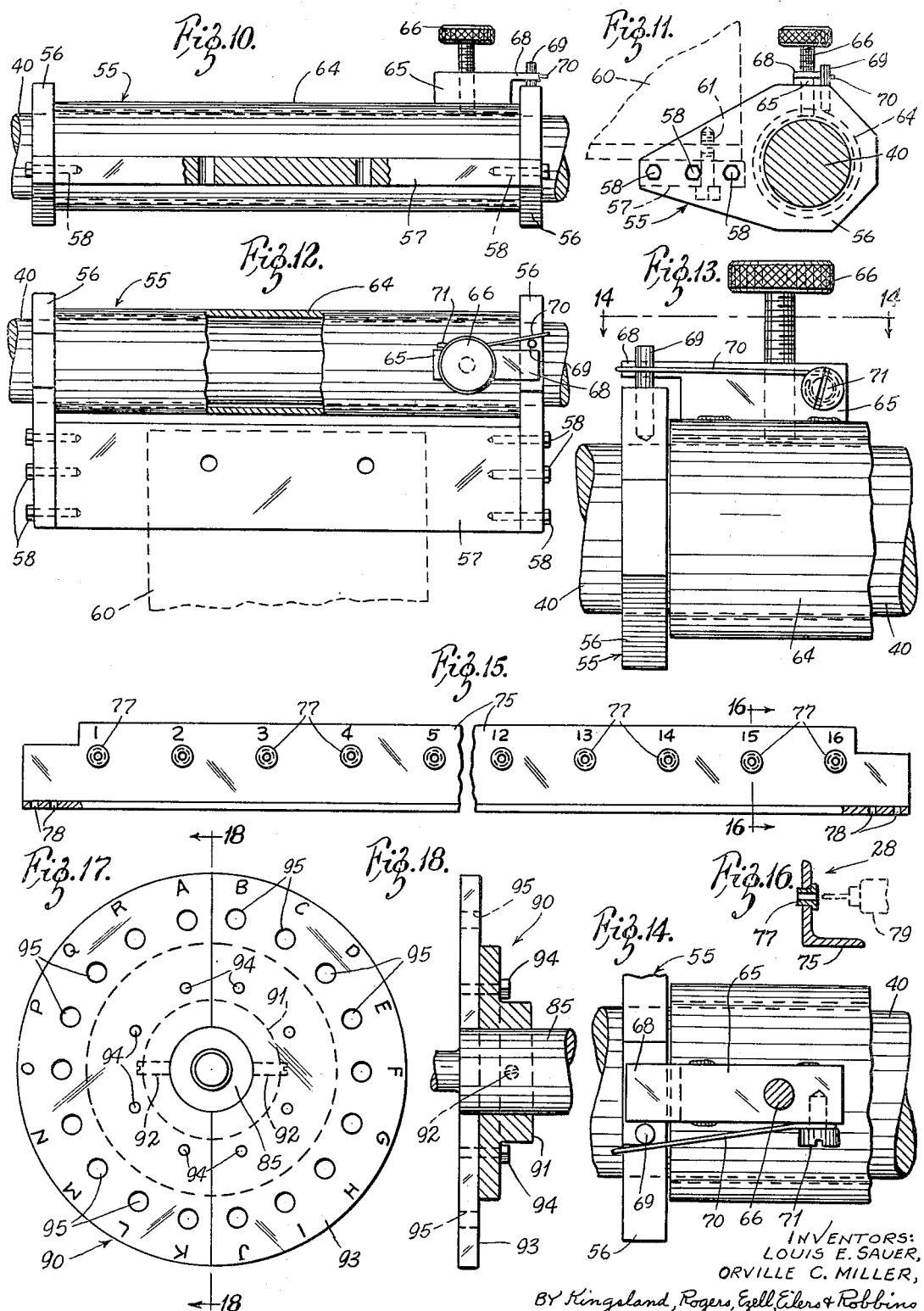

ABSTRACT OF THE DISCLOSURE

A rotary die sawing and drilling machine incorporating a rotatable arcurate workpiece support having releasable braking means, a saw mechanism including a supported saw manipulatable longitudinally of the workpiece support, a drilling structure for facilitating the drilling of mounting holes in the workpiece, and an indexing structure for insuring the proper selected fixed relationship of a supported workpiece and the drilling structure.

BACKGROUND OF THE INVENTION

Field of the invention

The present invention relates generally to the rotary die cutting art, and more particularly to a machine for sawing and drillig a low cost rotary die base for receiving the required cutting rule and for mounting the complete die upon a cylinder.

Description of the prior art

Heretofore, various means and methods have been attempted for making low cost dies for rotary die cutting with acceptable accuracy. Portable hand tools have been hand guided, but even one having skill in handling the saw cannot commercially produce.

SUMMARY OF THE INVENTION

In brief, the present novel rotary die sawing and drilling machine includes correlated sawing mechanism, drilling structure, and rotary die base or workpiece supporting structure. Means are provided for quickly, easily, and accurately sawing the arcuate workpiece to receive the cutting rule and for similarly drilling holes for mounting the workpiece in its final form as part of a rotary die upon a cylinder.

Therefore, objects of the present invention are to provide a novel rotary die sawing and drilling machine which is adapted to overcome the shortcomings of existing structures and methods and which satisfies the long-felt need for a fast, easily operated machine achieving accurate work, which can be employed to cut even intricate curves speedily and accurately by an operator with minimum skill and minimum training, which speeds up the ultimate production of rotary dies, particularly in the low cost bracket, which functions over a long period of time with minimum maintenance, thereby reducing down-time, and which otherwise fulfills the objects and advantages sought therefor.

BRIEF DESCRIPTION OF THE DRAWINGS

FIGURE 1 is a front elevational view of a rotary die sawing and drilling machine incorporating the teachings of the present invention;

FIGURE 2 is an end elevational view thereof looking from right to left in FIGURE 1;

FIGURE 3 is an end elevational view of the other end of the machine, the supporting members being cut away for conservation of space;

FIGURE 4 is an enlarged front elevational view of the end sections of the machine, the central portion, the supporting portion, and top parts of the two end portions of the machine being cut away for conservation of space;

FIGURE 5 is an enlarged fragmentary, horizontal cross-sectional view taken on substantially the line 5—5 of FIGURE 1;

FIGURE 6 is a further enlarged vertical cross-sectional view through one end of a braking structure illustrating details thereof;

FIGURES 7 and 8 are further enlarged, vertical, transverse cross-sectional view taken on substantially the lines 7—7 and 8—8, respectively, of FIGURE 5;

FIGURE 9 is a further enlarged, fragmentary sectional view of a peripheral portion of FIGURE 7;

FIGURE 10 is an enlarged front elevational view of the carrier or support for the saw, the supporting shafts being broken away at each side thereof for conservation of space and a front central portion of the supporting plate being broken away and in section for illustration of details;

FIGURE 11 is an end elevation thereof looking from right to left, a portion of the saw being indicated in broken lines;

FIGURE 12 is a top plan view thereof, a central portion of the sleeve being broken away and in section for illustration of details;

FIGURE 13 is a still further enlarged elevational view of the right-hand portion viewed from the other side;

FIGURE 14 is a horizontal, cross-sectional view taken on substantially the line 14—14 of FIGURE 13;

FIGURE 15 is a front elevational view of the drill bar, the central portion being broken away for conservation of space and end portions being in section for illustration of details;

FIGURE 16 is a vertical, transverse, cross-sectional view taken on substantially the line 16—16 of FIGURE 15, a portion of a hand drill being indicated in broken lines;

FIGURE 17 is an enlarged elevational view of the outer face of the indexing disk;

FIGURE 18 is a vertical cross-sectional view taken on substantially the line 18—18 of FIGURE 17;

FIGURE 19 is an enlarged side elevational view of the braking shoe; and

FIGURE 20 is a further enlarged, vertical, transverse cross-sectional view taken on substantially the line 20—20 of FIGURE 19.

DESCRIPTION OF THE PREFERRED EMBODIMENT

Referring to the drawings more particularly by reference numerals, 25 indicates generally a rotary die sawing and drilling machine incorporating the principles of the present invention. Broadly, the machine 25 includes supporting structure 26, sawing mechanism 27, drilling structure 28, a workpiece supporting structure 29, and interrelating and interconnecting elements.

The supporting structure 26 includes heavy opposed end angle members 30 and 31, the former being disposed vertically as is clearly shown in FIGURES 2 and 3, the flanges of each pair at the upper ends being welded, as illustrated, or bolted to a heavy plate 32. A base angle member 33 joins and braces the lower ends of each pair of members 30 and 31 and extends forwardly to give stability. Longitudinally extending angle irons 35 crossing to form an X further brace the members 30. Similarly, longitudinally extending angle irons 36 crossing as an X further brace the members 31. The supporting structure 26 may be modified, as desired, and may include other members.

The sawing mechanism 27 includes a longitudinally disposed shaft 40 the reduced ends of which are rotatably mounted in vertically movable bearing blocks 41 mounted between opposed vertical guide members 42 and disposed against the inner face of the plate 32 (FIGS. 2, 3 and 5). The guide members 42 are welded or bolted to the plate 32. Vertical strips 43 and 44, secured to the vertical guide members 42 by welding or bolts, trap the bearing blocks 41 (FIGS. 2–5). The strips 44 have rack teeth 46 which are engaged by pinions 47 fixed on reduced extensions of the shaft 40. The shaft 40 is moved up and down by manual rotation thereof through a pin 50 inserted in holes near each end of the shaft 40 serving as a lever.

Positioned on the shaft 40 is a saw supporting carrier 55 which includes two spaced flat bearing members 56 of the configuration clearly shown in FIGURES 10–14. A plate 57 is secured between and to the flat bearings 56 by suitable bolts 58, or the like, forming a sturdy structure. The plate 57 receives a saw 60 having handles 62, which is secured thereto by suitable bolts 61. Extending between the flat bearings 56 is a sleeve 64. A lug or small plate member 65 is welded or otherwise secured to the sleeve 64 adjacent one flat bearing 56, as is clear from FIGURES 10–14. A stop screw 66 is threadedly mounted in the lug 65 and extends through a suitable opening in the sleeve 64 for engagement with the shaft 40 for locking of the sleeve 64 in respect to the shaft 40 against relative movement, as desired. The lug 65 has a finger portion 68 extending over the flat bearing 56 for engagement against one side of a pin 69 mounted in the periphery of the flat bearing 56. Engaging the other side of the pin 69 is a strong spring 70 mounted at one end against a side of the lug 65 by means of a suitable screw 71. Thus, while the sleeve 64 is locked against both rotation and axial movement on the shaft 40 when the stop screw 66 is screwed downwardly, the flat bearings 56 can move an amount permitted by the spring 70, thereby permitting limited pivotal movement of the saw 60 in cutting a transverse annular intermittent slot. It will be understood that any type of saber saw with an offset swiveling blade can be employed for the instant machine, such as the heavy duty saber saw K–11 presently manufactured by The Cutawl Corporation of Bethel, Conn. The center of rotation of the swiveling blade of the saw is located on the vertical radius of the shaft 40, a relationship maintained in any position of vertical adjustment required for sawing workpieces of different radiuses. The saw 60 may be energized by a foot switch 72.

The drilling structure 28 includes a drill bar 75 of angular cross section which extends across the machine 25 and is supported on angle bar members 76 bolted or otherwise secured to the structural members 30 and 31, as is clear from FIGURES 2 and 3. Bushings 77 are pressed in the drill bar 75 in desired spaced relation, 16 being shown on the drill bar 75 of FIGURE 15. Bolt holes 78 are provided at the ends of the drill bar 75. In FIGURE 16 a hand drill 79 is illustrated in broken lines demonstrating use of the drill bar 75. The bushings 77 are disposed in position for drilling holes radially into an arcuate workpiece.

The workpiece supporting structure 29 comprises a shaft 85 having reduced extremities mounted in bearings 86 bolted to plates 87 in turn bolted to the structural members 30. Secured to and adjacent one end of the shaft 85 is a shaft indexing unit 90 comprising a hub member 91 secured to the shaft 85 by set-screws 92 and a split indexing disk 93 secured to the hub 91 by bolts 94. Apertures 95 are formed in the disk 93 in a circle, which are marked by letters for identification (FIGS. 3, 17 and 18). Bushings may be disposed in apertures 95, if desired. Mounted on the adjacent structural member 30 is a reciprocatable latch unit 97 including a plunger or bolt 98 adapted to be inserted into a selected aperture 95 when in the position as shown in FIGURE 4, and adapted to be free therefrom when the plunger 98 is rotated to free an arm 99 from one end portion of a slot 100 and moved to the left into a slot portion at the other end. Mounted on the shaft 85 in spaced relation are two or more arcuate workpiece supporting units 105, an arcuate workpiece 140 being shown in broken lines in FIGURE 1. As is clear from FIGURES 1, 5 and 7–9, each workpiece supporting unit 105 includes a hub 106 having a flange 107 to which is removably secured workpiece receiving disks 108 by suitable bolts 109. A suitable bolt 110 secures the hub 106 in selected position on the shaft 85. The disk 108 comprises two halves, so that it may be readily removed from the shaft 85 for replacement by a different size disk, larger or smaller, without disturbing other structural elements. In the periphery of the disk member 108 are spaced threaded bolt receiving steel inserts 112 for securing a workpiece in position. Similarly, inserts 113 are provided in the periphery of the flange 107, which thereby serves to support directly the minimum radius workpiece 140.

A brake unit 115 is provided for maintaining the shaft 85 against rotation when the bolt 98 is in inoperative position. Since the indexing disk 93 is employed primarily in drilling, it is normally not locked when the machine 25 is employed in sawing operations. In sawing, often it is necessary to maintain the workpiece against rotation. Viewing FIGURES 1 and 4, a first angle bracket 116 is secured by bolts to the plate 87 and a second angle bracket 117 of greater length is secured to the other plate 87 by suitable bolts. A threaded shaft 118 is threadedly mounted in the bracket 116 and depends therefrom for rotation in respect thereto. The shaft 118 also threadedly engages an arm 120 and is locked into one position in respect thereto by a lock nut 121 (FIG. 3). Similarly, a longer threaded shaft 123 rotatably threadedly engages the bracket 117 and threadedly receives an arm 124 in locked engagement therewith through the medium of a lock nut 125 (FIG. 2). An elongated operating bar 126 connects the two arms 120 and 124, being secured to the outer ends thereof by bolts 127 and 128, respectively (FIGS. 2, 3 and 6). The arms 120 and 124 have a plurality of threaded vertical apertures 130, thereby providing for adjustment. The shaft 123 engages a well in a shoe 131 comprising a split block 132 having an arcuate top surface 133 maintained in substantially adjacent relationship by a split casing 134 and nut and bolt assemblies 135 (FIGS. 6, 19 and 20). Mounted on and secured to the shaft 85 for rotation therewith is a disk 138 the periphery of which is engaged by the arcuate surface 133 when the operating bar 126 is in substantially one extreme position of movement. It will be readily understood from the foregoing that the threaded shaft 123 is rotated to move the split block 132 upwardly when the operating rod 126 is moved to the right and inwardly towards the machine 25, and to release the same when moved to the left and way from the machine 25.

It is manifest from the foregoing that once a workpiece 140 is mounted on the supporting units 105, an operator can quickly, easily and accurately drill and saw on the same setting thereof, assuring perfect alignment of all horizontal and vertical lines with mounting holes. The operator can easily and readily manipulate the saw 60 along the shaft with one hand and can rotate the workpiece 140 with the other hand to cut any configuration, as angles, curves, and straight lines and combinations of these, as required. The operating bar 126 makes it simple for the operator to release or lock the shaft 85 supporting the workpiece.

The present machine 25 can be employed to cut a rotary die support directly with the use of a layout previously shortened, or by the use of a cork layer of required thickness between the support and the layout.

It is apparent that there has been provided a rotary die sawing and drilling machine which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements which will be obvious to those skilled in the art, are contemplated as within the scope of the present invention which is limited only by the claim which follows.

We claim:

1. In combination, a sawing machine for making cuts in arcuate workpieces for receiving cutting rule comprising a base structure, supporting means mounted for rotation on said base structure for receiving an arcuate workpiece, said supporting means including means for accommodating arcuate workpieces of different radii, a saw unit mounted on said base structure including a saw supported in position for movement axially of a workpiece disposed on said supporting means, said saw being adjustable vertically to permit cutting workpieces of different radii, said saw in operative position being disposed with the rotatable shaft thereof radially of a workpiece, said saw unit including a horizontal shaft, a saw carrier rotatably and axially movable on said shaft, said carrier including a saw platform and a sleeve about the shaft, said saw being mounted on said platform, means for securing said sleeve to said shaft against movement, and means permitting limited rotation of said platform relative to said sleeve when secured, thereby permitting skip-cutting of said saw circumferentially of a workpiece, whereby a workpiece can be readily cut on straight, angled, curved and combination lines, as required.

References Cited

UNITED STATES PATENTS

| | | | |
|---|---|---|---|
| 544,010 | 8/1895 | Spalckhaver | 144—139 |
| 2,996,090 | 8/1961 | Smith | 143—68 |
| 3,209,653 | 10/1965 | Satre et al. | 90—15 |
| 37,446 | 1/1863 | Hull | 83—411 |
| 49,585 | 8/1865 | Boyle | 83—411 |
| 898,289 | 9/1908 | Voorhies | 144—136.8 |
| 2,543,405 | 2/1951 | Hayes | 144—136 |
| 2,714,242 | 8/1955 | Coven | 83—411 |
| 3,212,381 | 10/1965 | Heyer | 83—564 |

FOREIGN PATENTS 488,878  1/1954  Italy.

GERALD A. DOST, Primary Examiner

U.S. Cl. X.R.

29—560; 83—411, 647; 143—68; 144—139